Dec. 8, 1936.                F. W. SLACK                2,063,704
                     AUTOMOBILE SUSPENSION SYSTEM
                       Filed Dec. 13, 1933          3 Sheets-Sheet 1

Inventor
Frederic W. Slack
By Blackmore, Spencer & Flint
Attorneys

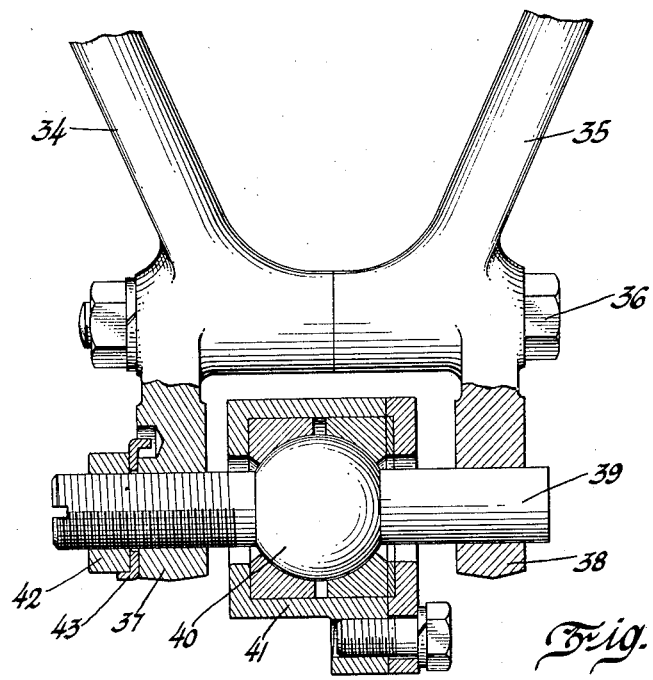
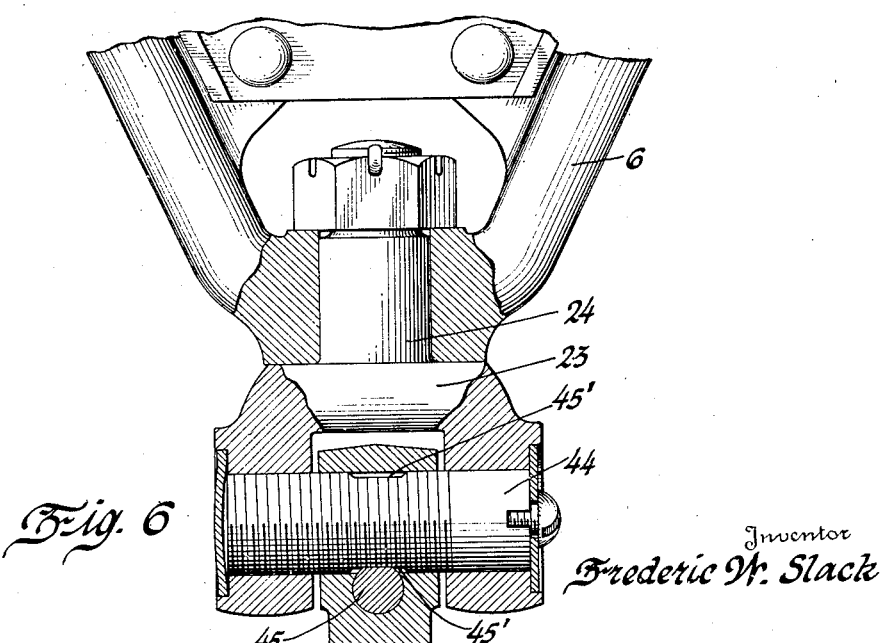

Dec. 8, 1936.  F. W. SLACK  2,063,704
AUTOMOBILE SUSPENSION SYSTEM
Filed Dec. 13, 1933   3 Sheets-Sheet 3

Inventor
Frederic W. Slack
By Blackmore, Spencer & Flint
Attorneys

Patented Dec. 8, 1936

2,063,704

UNITED STATES PATENT OFFICE 2,063,704

AUTOMOBILE SUSPENSION SYSTEM

Frederic W. Slack, Detroit, Mich., assignor to General Motors Corporation, Detroit, Mich., a corporation of Delaware Application December 13, 1933, Serial No. 702,143

10 Claims. (Cl. 280—124)

This invention relates to pivotal linkage supports for the road wheels of vehicles of that type in which a supporting bracket for each wheel is independently pivotally mounted between the outer ends of two substantially parallel laterally extending links which are pivoted one above the other to the chassis frame so as to be capable of swinging motion in a substantially vertical plane transverse to the longitudinal axis of the car.

It relates particularly to such supports for the dirigible road wheels of a motor vehicle in which the supporting bracket mounted between the outer ends of the parallel links has the steering knuckle with its king pin mounted thereon.

One object of the invention is a means of adjusting the inclination to the vertical of the knuckle bracket in a plane parallel with the longitudinal axis of the vehicle in order to obtain the requisite "caster angle" of the king pin.

Another object of the invention is to provide a pivotal linkage support of the foregoing type with suitable link pins of the threaded type in which a threaded pin is passed through an "eye" on one member and the jaws of a yoke or shackle like end on the other member, being screwed in one or both members and held against rotation in one member while the other member is capable of the required oscillating motion on the threaded part.

The above and other objects of the invention will be apparent as the description proceeds.

Threaded bearings for the angular oscillation of the link connections have known advantages of increased bearing and wearing surface area and any end thrust thereon is taken by the sides of the threads.

According to the invention the type of threaded pivot for each link point is modified according to the requirements of its position.

The drawings show the application of the invention to a construction in which the transverse swinging support links are V-shaped in plan with the point of the V connected to the knuckle bracket and the spaced apart legs suitably pivoted to the frame of the vehicle.

In the drawings

Figure 5 shows a link pin connection, alternative to Figure 2, with a ball joint dispensing with the need for a pivotal yoke.

Figure 6 shows a link pin connection similar to Figure 3 with an alternative means for locking the pin in one of the members.

Figure 1:
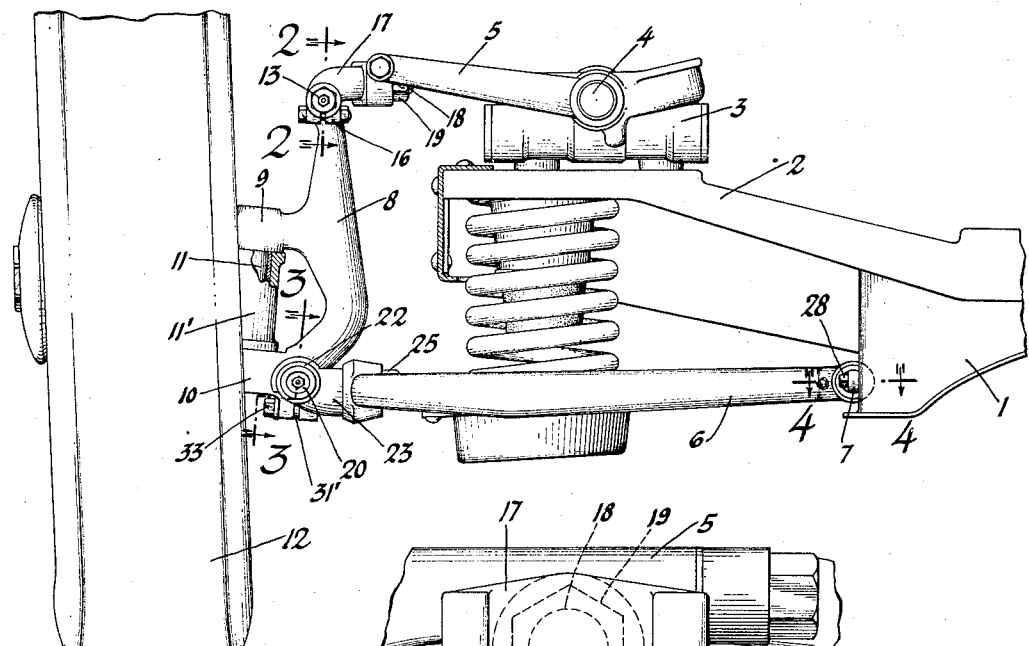
Figure 1 is an elevation of one dirigible wheel and its mounting.
Figure 2:
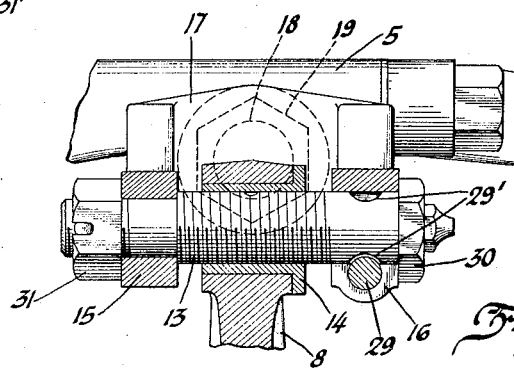
Figure 2 is a part section on line 2—2 of Figure 1 showing a link pin connection for the upper end of the knuckle bracket and the upper transverse supporting link whereby the relative position of these two members may be readily adjusted, and providing, in conjunction with pivoting yoke ends on both the upper and lower links to the knuckle bracket, for the required caster adjustment.
Figure 3:
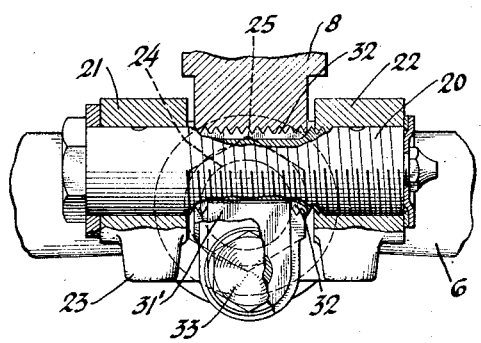
Figure 3 is a part section on line 3—3 of Figure 1 showing a link pin connection provided with a pivoted yoke and adapted for use in conjunction with the link pin of Figure 2 as the connection for the lower end of the knuckle bracket and its supporting link.
Figure 4:
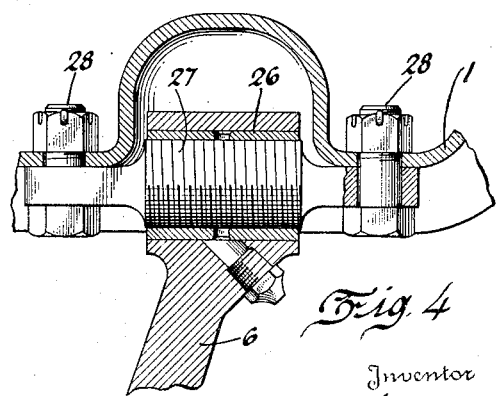
Figure 4 is a part section on line 4—4 of Figure 1 showing a suitable form of link pin for the connection between the supporting links and the frame of the vehicle.

Referring now particularly to Figures 1, 2, 3, and 4, 1 is the frame of the vehicle having an outrigger 2 rigidly fixed thereto.

Rigidly fixed to the outrigger 2 is a shock absorber 3 of hydraulic type, having an actuating spindle 4 to which the upper support link 5—V-shaped in plan—has its spaced apart legs keyed or otherwise suitably fixed.

The lower support link 6—V-shaped in plan—has its spaced apart legs pivoted about pins 7 fixed to the frame 1.

Pivotally attached to the ends of the supporting links at the point of the V is the knuckle bracket 8 having bearings 9 and 10 for the king pin 11 to which the spindle forging 11' of wheel 12 is secured.

The upper pivotal attachment of the knuckle bracket 8 to the support link 5 consists of a pin 13 screw threaded in a bushing 14 secured in the knuckle bracket 8 and having plain ends held in the jaws 15 and 16 of a yoke 17 which has a stem 18 mounted with its axis substantially horizontal and in a plane at right angles to the axis of pin 13 in the supporting link 5 at the point of the V. The stem 18 is provided with a lock nut 19.

The lower pivotal attachment of the knuckle bracket 8 to the support link 6 consists of a pin 20 screwed through the knuckle bracket 8 and in one of the jaws 21 and 22 of a yoke 23 which has a stem 24 mounted with its axis substantially horizontal and in a plane at right angles to the axis of pin 20 in the support link 6 at the point of the V. The stem 24 is provided with a lock nut 25.

The spaced apart legs of the support link 6 have a threaded bushing 26 and pivot about a threaded pin 27 having flattened ends and bolted to the frame 1 by bolts 28.

The jaw 16 of yoke 17 is split and provided with a combined clamp bolt and cotter 29 for locking the threaded pin 13 in the yoke at points 180° apart radially of the longitudinal axis of the pin having notches 29' for the cutter. The pin is additionally held against displacement under end thrust by the head 30 and the nut 31. Upon withdrawing the clamp bolt 29 and loosening the nut 31 the pin 13 may be turned in either direction during which operation the upper end of the knuckle bracket moves backwards or forwards on the threaded pin.

The lower end of the knuckle bracket 8 through which the pin 20 is screwed is split to provide for the insertion of a flat key 31' engaging keyways 32 in the pin 20 at points 180° apart radially of the longitudinal axis of the pin. The key is held in position and the knuckle bracket clamped to the pin by a screw 33. In assembly the pin 20 is passed through the plain jaw 21 of the yoke and is screwed through the knuckle bracket a distance equal to the space which is required between the knuckle bracket and the threaded jaw 22 whereupon the pin is started in the threads of the jaw 22 and screwed home. It is then adjusted to a position in which the key 31' may enter one of the keyways 32 thereby locking the pin in the knuckle bracket.

It will be apparent that upon turning the pin 13 after removing its locking means and loosening the lock nuts 19 and 25, the upper end of the knuckle bracket may be moved backwards or forwards while the stems 18 and 24 of the upper and lower yokes will accommodate themselves to this adjustment by a pivotal movement around their own axes and the king pin 11 will have its inclination changed in a vertical plane parallel with the longitudinal axis of the car, thus effecting any desired change in the caster angle of the king pin.

Figures 5 and 6 show alternative forms of threaded pins for the link connection of the knuckle bracket to the upper and lower support links.

In Figure 5, the upper support link consists of two legs 34 and 35 held together at the point of the V by a bolt 36. The two jaws 37 and 38, of which 37 is screw threaded, carry a pin 39 which is provided with a ball portion 40 forming with the knuckle bracket 41 a ball joint between the upper support link and the knuckle bracket. The position of the joint is adjustable horizontally and in a direction substantially parallel with the longitudinal axis of the vehicle by screwing the pin forwards or backwards in the jaw 37 to which it is locked in any required position of axial adjustment by the nut 42 and the lock washer 43.

Figure 7:
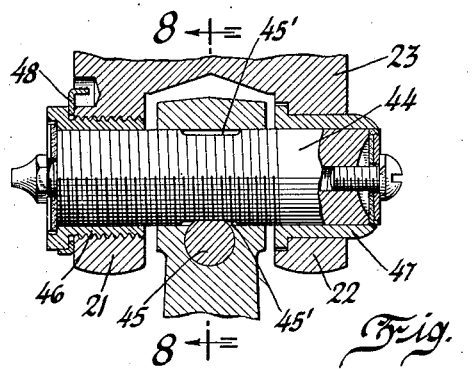
Figure 7 shows a form of link pin connection similar to Figures 3 and 6 but provided with hardened bushings for the bearing surfaces in one of the members.
Figure 8:
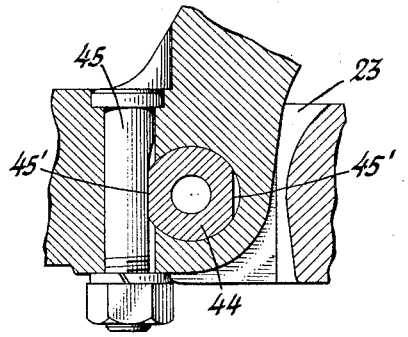
Figure 8 is a section on line 8—8 of Figure 7.

In Figures 6, 7, and 8, the pin 44 in the yoke 23 for the lower support link (not shown) is locked to the lower end of the knuckle bracket by a cotter pin 45 engaging flats 45', on the pin spaced 180° apart radially of the longitudinal axis of the pin.

In Figure 7, the yoke 23 is provided with hardened steel bushings 46 and 47 of which 46 is threaded inside and out for screwing in the jaw 21 of the yoke, while the bushing 47 is plain inside and out and is a press fit in the jaw 22. The bushing 46 is locked in the jaw 21 by a suitable lock washer 48.

Figure 9:
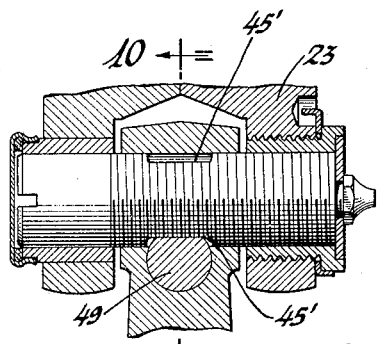
Figure 9 shows a form of link pin connection similar to Figure 7 with an alternative means for locking the pin in one of the members.
Figure 10:
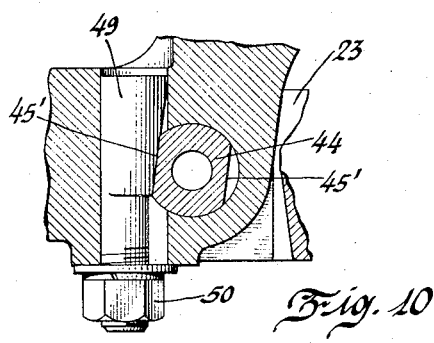
Figure 10 is a section on line 10—10 of Figure 9.

In Figures 9 and 10 the yoke 23 is provided with bushings similar to those shown in Figure 7, while the knuckle bracket is locked to the pin by a tapered cotter pin 49 drawn up by a nut 50 into engagement with the flats 45' on the pin.

The threaded pivotal connections are all of a type which can be easily assembled. In many of the forms of threaded pivotal connection hitherto employed in other constructions the pin has been threaded in both jaws of one of the members. Since the jaws are fixed relatively to one another difficulty has been encountered in securing the necessary coincidence of the threads in one of the jaws with the threads on the pin after it has been screwed through the other jaw. The pin has been difficult to "start" in the second jaw through which it has been screwed. This difficulty is obviated in all the pivotal connections according to the invention.

I claim:

1. In a vehicle wheel suspension, wheel supporting means including a knuckle bracket, wheel displacement guiding means, and wheel adjusting means intermediate said supporting means and said guiding means, said adjusting means including a wheel caster adjusting member shiftable in the general direction of the wheel plane and means connecting said adjusting member to said knuckle bracket.

2. In combination, a motor vehicle frame, a pair of links pivotally connected to the frame for vertically pivotal movement, a front wheel mounting and castering member extending between free ends of the links, means pivotally connecting the free ends of the links to the member for relative pivotal movement in the vertical plane of the links, means for adjusting one end of the member transversely of the link connected thereto, and means in the connection between the other end of the member and the other link for enabling the member to pivot in a plane transverse to the links during adjustment of the member.

3. In a vehicle suspension system, a frame, support links extending laterally therefrom, a knuckle bracket for a dirigible road wheel a king pin in the knuckle bracket, pivotal connections including link pins between the knuckle bracket and each of the support links at spaced points on the knuckle bracket providing for pivotal swinging movement in a substantially vertical transverse plane, means providing for an adjustment of the positions relatively to one another of the knuckle bracket and one of the support links axially of their link pin and means providing for an accommodating pivotal movement of the knuckle bracket relatively to each of the support links in a plane containing the axes of the link pins upon effecting said adjustment, whereby the "caster angle" of the king pin may be varied.

4. In a vehicle suspension system including a knuckle bracket member and a supporting link member therefor, a pivotal connection between the knuckle bracket member and the supporting link member, including a screw threaded link pin, one of the members being connected thereto through a part capable of pivoting about an axis in a plane at right angles to the axis of the threaded pin and the other member being linked directly to the pin, and means for locking the pin to one of the members, the other member having a threaded part engaging threads on the pin.

5. In a vehicle suspension system including a knuckle bracket member and a supporting link member therefor, a pivotal connection between the knuckle bracket member and the supporting link member including a screw threaded link pin screwed in one of the members, and provided with a ball portion to which the other member is connected for limited universal movement thereabout, and means for locking the pin in different positions of axial adjustment in the member in which it is screwed.

6. In a vehicle suspension system, a frame, a pair of support links extending laterally therefrom, a knuckle bracket for a dirigible road wheel, a king pin in the knuckle bracket, pivotal connections including screw threaded link pins between the knuckle bracket and each of the support links at spaced points on the knuckle bracket, each of the support links being connected to the threaded pin through a part capable of pivoting about an axis in a plane at right angles to the axis of the threaded pin, the knuckle bracket being linked directly to the pin, means for locking one of the pins to the aforesaid pivotal part of one of the links and means for locking the other pin to the knuckle bracket, one of the threaded pins being unthreaded throughout the part to which it is locked whereby the "caster angle" of the kingpin may be adjusted by removing the locking means and turning the threaded pin.

7. In a vehicle suspension system, a frame, support links extending laterally therefrom, a knuckle bracket for a dirigible road wheel a king pin in the knuckle bracket, a pivotal connection between the knuckle bracket member and one of the support link members including a threaded pin adjustably screwed and locked in one of the members and having a ball portion to which the other member is connected for limited universal movement thereabout, and a pivotal connection between the knuckle bracket member and the other support link member including a threaded link pin screw threaded in one of the members and in a part capable of pivoting in the other member about an axis in a plane at right angles to the axis of the threaded pin, means for locking the last named pin to one of the members, and means whereby the "caster angle" of the king pin may be varied by an adjustment of the position of the knuckle bracket relatively to one or both of the support links axially of the link pins.

8. In a vehicle suspension system, a link pin connection for relative angular oscillation between two members including spaced jaws on one member straddling a threaded "eye" on the other member, one of the jaws having a threaded bore aligned with the "eye", the other jaw having a plain bore aligned with the "eye", a pin threaded for part of its length and screwed into the "eye" and the threaded jaw with its unthreaded portion in the plain bore of the other jaw, and means for locking the pin to one of the members.

9. In a vehicle suspension system, a link pin connection for relative angular oscillation between two members including spaced jaws on one member straddling an "eye" on the other member, one of the jaws having a threaded bore aligned with the "eye", the other jaw having a plain bore aligned with the "eye", a pin threaded for part of its length passing through both jaws and the "eye", being screwed into the threaded jaw with an unthreaded portion in the plain bore of the other jaw, and means for locking the pin in the "eye".

10. A hinge joint comprising spaced lugs having axially aligned orifices, the wall of one orifice having a threaded bearing surface, and a hinge pin threaded externally and having a threaded bearing engagement with the threaded wall of said orifice and having its other end supported in a journal bearing in the other of said lugs.

FREDERIC W. SLACK.